Patented Mar. 21, 1950

2,501,597

UNITED STATES PATENT OFFICE 2,501,597

PRODUCTION OF ORGANIC HALOGEN COMPOUND

Kenneth D. Detling, Berkeley, Calif., assignor to Shell Development Company, San Francisco, Calif., a corporation of Delaware No Drawing. Application October 12, 1943, Serial No. 506,014

8 Claims. (Cl. 260—658)

This invention relates to the synthesis of organic compounds containing one or more fluorine, chlorine, bromine or iodine atoms and deals particularly with an improved method for producing such compounds from simpler halogen-containing organic materials. The invention is especially concerned with the reaction of compounds having a tertiary aliphatic halogenated carbon atom with unsaturated organic compounds, particularly with unsaturated organic halides and with the production of products of lower halogen content from the polyhalides thereby obtained. Novel polyhalides obtainable by the new process are another important feature of the invention.

A number of different methods are available for the production of organic halides. These are generally quite satisfactory for the production of the simpler lower halides but have serious disadvantages when applied to the production of halides, particularly polyhalides, of six or more carbon atoms per molecule, especially branched chain halides. Halogenation of the corresponding paraffin or addition of halogen to the corresponding olefin is seldom feasible because these hydrocarbons are usually not available in a pure form and when the reactions are carried out on hydrocarbon mixtures the halogenation products are complex mixtures which are very difficult to separate. Even when relatively pure hydrocarbons are used, the tendency for halogen substitution to take place on all of the carbon atoms present results in the formation of highly mixed products and makes any individual halide which can be isolated therefrom very expensive because of the large amounts of undesired halide by-products which must be separated.

The present invention is based upon the discovery that saturated aliphatic halides having a tertiary halogenated carbon atom may be reacted with halogenated compounds having an aliphatic unsaturated linkage in the molecule. By this reaction polyhalides, many of which are new and useful compounds, may be produced in an efficient and economical manner.

A wide variety of different saturated halides having a halogen atom attached to a tertiary aliphatic carbon atom may be used in the process. Among the simpler tertiary alkyl halides which may be used are, for example, tertiary butyl chloride, tertiary amyl chloride, 2-chloro-2-methylpentane, 3-chloro-3-methylpentane, 2-chloro-2,3-dimethylbutane. Higher homologues such, for example, as 2-chloro-2,4,4-trimethylpentane have also been successfully used in the process. While tertiary chlorides are preferred because of their generally lower cost, the corresponding fluorides, bromides and iodides, when available, may also be used in the process. Instead of open chain tertiary halides, cyclic compounds having a tertiary carbon atom may be used. Typical tertiary halides of this class are, for example, 1-chloro-1-methylcyclohexane, 1-chloro-1,2-dimethylcyclohexane, chlorisopropylcyclohexane, etc., and the corresponding bromides and the like. The tertiary halide may contain a plurality of halogen atoms. Thus, instead of tertiary butyl chloride, 1,2-dichloro-2-methylpropane; 1,2,3 - trichloro - 2 - methylpropane; 1,1,2-trichloro - 2 -methylpropane; 1,2-dichloro-2-chloromethylpropane and more highly halogen substituted tertiary butyl chlorides may be used. The other halogen atom or atoms of the polyhalogenated tertiary halides need not be the same as that attached to the tertiary carbon atom. Examples of such mixed halides are 1-bromo - 2 - chloro-2-methylpropane; 1-chloro-2,3-dibromo-2-methylbutane and the like which react in the present process in the same manner as the corresponding tertiary alkyl monohalide.

Unsaturated halides which may be used in the new process include organic compounds having a halogen atom attached to an aliphatic carbon atom and containing an unsaturated aliphatic linkage in the molecule. Especially suitable are olefinic aliphatic hydrocarbons having a halogen atom substituted therein but those which also contain other substituents which do not interfere with the reaction may also be used. For economic reasons unsaturated chlorides are generally preferred. Typical of such chlorides are, for example, vinyl chloride, propenyl chloride, isopropenyl chloride, isocrotyl chloride, 2-chlorobutene-2, 2-chloro-3-methylbutene-2, allyl chloride, crotyl chloride, methylvinylcarbinyl chloride, methallyl chloride, dimethylvinylcarbinyl chloride, methylisopropenylcarbinyl chloride, dimethylisopropenylcarbinyl chloride, 2-chloropentene-3, 2-chloro-2-methylpentene-3, 1-chloro-2-methylbutene-2, 1-chloro-3-methylbutene-2, 1-chloro-2,3-dimethylbutene-2, 1 - chlorobutene-3, 1-chloro-2,2-dimethylbutene-3. The unsaturated halide used may be a cyclic compound such as chlorocyclohexene - 1, chlorocyclohexene-2, chloromethylcyclohexene-1, or the like. Instead of these simpler compounds, higher homologues and substitution products thereof may be used. Equally good results may be obtained by using the corresponding unsaturated fluorides. Bromides or iodides may also be used although they are likely to produce reaction products of somewhat different composition as a result of the greater reactivity of these halogens. The simplest products are usually obtained with unsaturated halides having the halogen attached to a terminal carbon atom, most preferably a carbon atom directly linked to an olefinic carbon atom. Side reactions should be guarded against even when using mono-olefinic halides since many of these such, for example, as vinylidene chloride polymerize very readily. With the mono-olefinic halides used, the main halide product or products will be saturated compounds formed by the union of one molecule of tertiary halide with one molecule of the unsaturated halide. The halogenated unsaturated compound may be used as the pure or substantially pure chemical individuals or in the form of mixtures of one or more such compounds with or without other components such as paraffins, hydrogen, etc., which may be inert or may react under conditions of operation chosen without interfering with the desired reaction. An especially advantageous source of starting materials for the process is petroleum products, particularly fractions or individual components from catalytic or non-catalytic cracking of petroleum hydrocarbons. Petroleum cracking fractions which contain substantial amounts of paraffins and olefins, for example, butane-butylene fractions comprising mainly normal and isobutane and butanes, are desirable starting materials. By selectively hydrohalogenating or halogenating as by the procedure claimed in U. S. Patent 2,010,389, for example, the isobutylene content of such a fraction or a mixture of tertiary butyl halide, butenes and butanes is obtained which can be further halogenated, for example, as disclosed in U. S. Patent 2,130,084 or 2,278,527 to obtain a mixture comprising tertiary halides and unsaturated halides which may be used as feed for the present process. After reaction according to the invention the unreacted paraffins are separated and fractionated to segregate the unreacted isobutane content, if any, which may then be halogenated to form additional tertiary butyl halide which may be added to the butane-butylene feed along with the simultaneously formed hydrogen halide which may be used for the hydrohalogenation of the isobutylene as may also any hydrogen halide recovered from the unsaturated halide production step. In this way substantially complete utilization of the halogen may be efficiently achieved. By isomerization of the separated normal butane content and/or halogenation of the latter and isomerization of the resulting straight chain halides, tertiary halides for use in the process may be obtained. Alternatively, the normal paraffins may be dehydrogenated and the resulting olefins halosubstituted or the halogenated normal paraffins may be dehydrogenated to obtain complete utilization of the hydrocarbon starting materials. This advantageous modification of the process of the invention is not limited to hydrocarbon fractions made up substantially of compounds of four carbon atoms per molecule but may be employed with higher boiling fractions such as pentane-amylene fractions, etc., or mixtures of wider boiling range, as cracked gasoline fractions and the like.

As catalysts for the reaction, inorganic halides are used. Metal halide, particularly of the Friedel-Crafts type, are especially advantageous but suitable hydrogen halides such as hydrogen fluoride may also be used. Aluminum chloride, aluminum bromide, ferric chloride, titanium tetrachloride and antimony trichloride have been found to be suitable. Less active catalysts such as stannous or stannic chloride, bismuth chloride, etc. have also been used. The catalysts may be used in solid form as lumps or granules or finely divided powders, or may be deposited on supports or carriers which may be inert or may have an advantageous influence on the reaction. U. S. Patent 2,295,977, for example, describes a method suitable for the preparation of such supported catalysts. Catalysts in the liquid state offer many advantages in the process. Friedel-Crafts type catalysts such as the aluminum halides may be used in this form by converting them to organic complexes. Organic complexes of active metal halides and ketones such as described in U. S. Patent 2,085,535 or metal halide-alkyl halide complexes such as may be prepared, for example, by refluxing the tertiary alkyl halide to be used in the reaction with the corresponding aluminum halide, may be used. Other suitable complex catalysts are those formed by the union of active metal halides with hydrocarbons, which may be either aliphatic or aromatic, or mixtures of hydrocarbons. The catalysts claimed in U. S. Patent 2,306,261, for example, may be used. Double salts of aluminum chloride such as are described in U. S. Patent 2,076,201 are also useful in the process. Complexes or sludges formed in the course of the reaction may, after addition of fresh metal halide, be used as the catalyst. When hydrogen fluoride is used as the catalyst, it is preferably employed in the form of the liquid anhydrous acid but concentrated solutions may also be used. While boron fluoride may be used as a gas it is likewise preferable in liquid form.

With Friedel-Crafts type catalysts it may sometimes be advantageous to use a small amount of an activator such as the corresponding hydrogen halide. More often, however, no activator is necessary since the tertiary halide used in the reaction is capable of maintaining the desired activity of the catalyst.

It has been found most advantageous to use a stoichiometric excess of tertiary halide based on the unsaturated compound or compounds present in the reaction mixture. At least 1.5 and more preferably 3 to 10 or more mols of tertiary halide are fed to the reaction for each mol of mono-olefinic compound supplied. Still higher ratios, are advantageous when polyolefinic compounds are to be reacted. Most preferably, a higher ratio of tertiary halide to unsaturated halide is maintained in the reaction mixture than is used in the feed. U. S. Patent 2,232,674 describes a convenient method of continuous reaction which may be used to achieve such desirable higher ratios when carrying out the reaction with catalyst and reactants in the liquid phase. By this procedure ratios of tertiary halide to unsaturated halides of the order of 100 to 500:1 or higher may be economically maintained in the reaction mixture when using feed ratios of about 3 to 90:1. For batch reaction under liquid phase conditions, when using liquid or suspended solid catalysts, the desired excess of tertiary halide to unsaturated halide may be achieved by intimately contacting an excess of the tertiary halide with the catalyst and then slowly introducing the unsaturated halide to be reacted therewith, most preferably together with an additional amount of the tertiary halide.

Countercurrent or concurrent contact of reactants with catalyst in suitable towers or other mixing devices are suitable methods for carrying out the process. Instead of operating with both reactants in the liquid phase, either or both may be in the gaseous state. Thus, for example, vinyl chloride or allyl fluoride may be bubbled through a solution or suspension of aluminum chloride in the tertiary halide being reacted or these unsaturated halides may be passed up a packed tower, down which the mixture of catalyst and tertiary halide flows. Alternatively, a gaseous mixture of the tertiary halide and unsaturated halide with the former in substantial molecular excess may be passed through tubes or other suitable reactors containing a Friedel-Crafts type catalyst. Intermittent operation with periodic replacement or regeneration of the catalyst may be used instead of continuous or batch procedures.

The temperature, pressure and space velocity which will be most desirable in a given case will depend upon the teritary halide or halides and the unsaturated halide being reacted, the catalyst chosen and the method of reaction adopted. As a general rule, it is desirable to carry out the reaction at as low a temperature as is consistent with economical conversions since side reactions often increase with the temperature. With aluminum chloride catalysts, whether used as such or in the form of organic complexes, it has been found that temperature below 50° C. are preferable and more advantageously temperature between about −20° C. and +20° C. are used for reactions in the liquid phase. Good results have been obtained with ferric chloride at about 0° C. Less active catalysts require higher temperatures but it is preferred in most cases to keep the temperature below about 100° C.

The amount of catalyst necessary varies with the particular inorganic halide catalyst chosen. Highly active catalysts such as aluminum chloride are effective when as little as about 0.01 mol is used per mol of unsaturated halide employed, although it is preferable to use somewhat larger amounts of the order of about 0.03 to 0.2 mol per mol of unsaturated halide. With less active catalysts such as antimony trichloride, for example, at least 0.3 and more advantageously 0.5 to 1.0 mol or more per mol of unsaturated halide is used in liquid phase operations. The catalyst may be repeatedly recycled to the reaction after separation of the product so that the actual consumption is quite low.

The following examples illustrate some of the methods by which the new reaction may be carried out and show its advantages.

Example I

Tertiary butyl chloride was reacted with allyl chloride in a reactior provided with a stirrer and condenser. An aluminum chloride-allyl chloride complex was used as catalyst. The catalyst was prepared at 0° C. by slowly adding allyl chloride together with about 0.3 weight per cent of hydrogen chloride to an agitated mixture of 200 grams of anhydrous aluminum chloride in 150 ml. of n-pentane. When about 3 mols of allyl chloride per mol of aluminum chloride had been added, the suspended aluminum chloride appeared to be nearly completely sludged and the addition of allyl chloride was stopped. The reactor was charged with 92 grams of this catalyst and 370 grams of tertiary butyl chloride. Allyl chloride was then fed in dropwise to the stirred mixture for 30 minutes, during which time 153 grams were added. The temperature was maintained at −20° C. throughout the reaction. The reaction mixture was stirred for about an hour after the addition of the allyl chloride was stopped and the reaction products were then separated from the catalyst layer and fractionated in a column of 15 theoretical plates. Approximately 70% of the product corresponds to 1,2-dichloro-4,4-dimethylpentane boiling at 68° C. under 22 mm. pressure. About 20% to 25% of another halide boiling near 88° C. at 22 mm. was also produced. The physical properties of the fractions obtained in the distillation were as follows:

| Boiling Range (20 mm.) | $d_4^{20}$ | $n_D^{20}$ |
|---|---|---|
| 50 °C.–68.2 °C. | 0.8977 | 1.4098 |
| 68.2 °C.–68.5 °C. | 1.002 | 1.4456 |
| 68.5 °C.–86 °C. | 1.023 | 1.4483 |
| 86 °C.–89 °C. | 1.032 | 1.4552 |
| 89 °C.–100 °C. | 1.042 | 1.4602 |

Example II

In another run with the same catalyst at 0° C., 115 grams of allyl chloride were added during 30 minutes to a stirred mixture of 277 grams of tertiary butyl chloride and 112 grams of catalyst. The product contained about 53% of 1,2-dichloro-4,4-dimethylpentane, considerable disproportionation having taken place resulting in increased amounts of light ends and higher boiling products.

Example III

Using the same reactor as was employed in Example I, allyl chloride was reacted with tertiary butyl chloride using ferric chloride as the catalyst at 10° C. Two mols of tertiary butyl chloride were used per mol of allyl chloride and 25 grams of catalyst were employed with 231 grams of tertiary butyl chloride. The run lasted two hours. The ferric chloride was slightly sludged but active. The product contained approximately 45% of 1,2-dichloro-4,4-dimethylpentane and 15% lower boiling products; the remainder consisting mainly of the high boiling halide boiling near 88° C. at 20 mm. and heavy ends.

Example IV

To an initial charge of 69 grams of titanium tetrachloride and 185 grams of tertiary butyl chloride in the same apparatus, 77 grams of allyl chloride were added at 24° C. After 90 minutes reaction, the product was allowed to stand overnight at 20° C. before the catalyst was removed. Distillation gave the following fractions:

| Boiling Range | Pressure | Weight Per Cent |
|---|---|---|
| | Mm. | |
| 54 °C.–108 °C. | 760 | 11 |
| 40 °C.–66 °C. | 20 | 11 |
| 66 °C.–68.5 °C. | 20 | 38.5 |
| 68.5 °C.–99 °C. | 20 | [1] 16.5 |
| Higher boiling | | 23 |

[1] 1,2-dichloro-4,4-dimethylpentane.

Example V

Reaction of tertiary butyl chloride with methallyl chloride (mol ratio, 3:1) in the presence of a complex catalyst of aluminum chloride and tertiary butyl chloride in the apparatus described in Example I gives as the main C₈ dichloride product of reaction at −20° C. a fraction boiling at about 77° C. under 20 mm. mercury pressure.

This dichloride appears to correspond to the structure 1,2-dichloro-2,4,4-trimethylpentane.

*Example VI*

Under the same conditions tertiary butyl chloride reacts with vinyl chloride to give a dichlorohexane boiling 146.4° C. to 146.5° C. having the following characteristics:

| | |
|---|---|
| $d_4^{20}$ | 1.0255 |
| $n_D^{20}$ | 1.4388 |
| Br No | 0.2 |
| Percent chlorine | 45.4, 45.5 |
| Mol. wt | 154 |

This compound appears to have the probable structure

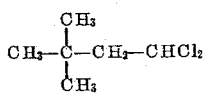

i. e. 1,1-dichloro-3,3-dimethylbutane.

In the same way reaction of tertiary butyl chloride with propenyl chloride gives 1,1-dichloro-2,3,3-trimethylbutane and tertiary butyl chloride with crotyl chloride gives 1,2-dichloro-3,4,4-trimethylpentane as the main product.

*Example VII*

When isopropyl chloride was substituted for the tertiary butyl chloride in Example I, keeping the other reaction conditions approximately the same, it was found that no reaction took place between the ispropyl chloride and the allyl chloride.

Likewise when using sulfuric acid as the catalyst, tertiary butyl chloride does not give a dichloroheptane by reaction with allyl chloride.

*Example VIII*

By substituting tertiary amyl chloride for the tertiary butyl chloride used in Example I, 1,2-dichloro-4,4-dimethylehexane is obtained as the principal dichloride.

It will be seen from these typical examples that the process of the invention is capable of wide variation not only as regards the tertiary halides and unsaturated halogenated compounds which may be reacted but also with respect to the inorganic halide catalysts which may be used. The new process makes available valuable new aliphatic saturated polyhalides which cannot be economically produced by previous methods. An especially advantageous group of such halides are those of 6 to 21 carbon atoms having a polyhalogenated carbon atom linked by a single carbon atom to a quaternary carbon atom. Examples of such halides are the 1,1-dichloro-3,3-dimethylbutane and the 1,1-dichloro-2,3,3-trimethylbutane whose preparation is described in Example VI, 2,2-dichloro-4,4-dimethylpentane obtained in the same way from tertiary butyl chloride and isopropenyl chloride; 1,1-dichloro-2,2,3,3-tetramethylbutane from tertiary butyl chloride and isocrotyl chloride and the corresponding mixed halide compounds such as 1-chloro-1-fluoro-3,3-dimethylbutane, 1-chloro-1-fluoro-4,4-dimethylpentane, and 1-chloro-1-fluoro-2,2,3,3-tetramethylbutane which may, for example, be obtained by substituting unsaturated fluorides for the unsaturated chlorides used in these illustrative examples.

These new polyhalides are valuable intermediates in the preparation of other useful compounds. Those having two halogen atoms attached to a terminal carbon atom may be readily hydrolyzed to the corresponding aldehyde by heating with water at about 100° C. in the presence of lead oxide (PbO). Ketones are obtained under the same conditions from those having two halogen atoms attached to a non-terminal carbon atom. Thus, for example, 3,3-dimethylbutanal is obtained from the 1,1-dichloro-3,3-dimethylbutane produced by reacting tertiary butyl chloride with vinyl chloride. The aldehydes and ketones, many of which are themselves new compounds, are useful solvents or plasticizers for lacquers and synthetic resins, etc. They may be condensed in the presence of acid or basic agents to produce higher unsaturated aldehydes and ketones and may be hydrogenated to the corresponding alcohols or oxidized to produce acids.

A special feature of the process of the invention is the conversion of the polyhalides obtained as previously described to compounds of lower halogen content by reaction with isoparaffins. This procedure makes it possible to produce monohalides from dihalides, for example. The reaction may be effected with any of the previously described metal halide catalysts. Any suitable method of intimately contacting the reactants in the presence of the catalyst may be used. Temperatures and times of contact similar to those described for the reaction of tertiary alkyl halides with unsaturated halides are advantageous. The following example shows a typical application of this new reaction.

*Example IX*

A mixture of 300 grams of the dichloroheptane (1,2-dichloro-4,4-dimethylpentane obtainable by the methods of Examples I to IV) and 345 grams of isobutane was agitated for one hour in a one-liter high-speed mixer at 0° C. with 90 grams of the allyl chloride-aluminum chloride complex catalyst described in Example I. A distillation of the product showed that 90% of the dichloroheptane had reacted, the main products being: isopentane, 10%; tertiary butyl chloride, 30%; heptanes, 15%; octanes, 12%; monochloroheptane, 25%; and higher boiling material, 8%.

The reaction may be effected in conjunction with the formation of the polyhalide as previously described by adding an isoparaffin such as isobutane, isopentane, dimethylbutane, methylcyclohexane, etc. with the feed and recycling to the reaction any higher halides recovered from the product.

While the reaction of isoparaffins with polyhalides formed from tertiary halides and unsaturated halides has been emphasized, this feature of the invention is not limited to the use of polyhalides so produced. Polyhalides from other sources may also be used, it being understood that the character of the products may vary with the nature of the starting materials chosen.

Aside from their use as intermediates in the preparation of other useful compounds, the new polyhalides of the invention have many important applications. They are solvents for a wide variety of organic compounds and are especially suitable as solvents or thinners for lacquers, synthetic resin base enamels and varnishes, and the like. They may be employed for extracting oils, gums, etc. from vegetable materials and may be used in dry cleaning preparations of reduced inflammability. It will thus be seen that the process and products of the invention offer many advantages and are capable of wide application. The invention accordingly will be understood as not limited to the details cited by way of illustrating the novel higher saturated halides which may be produced and the valuable derivatives into which they may be converted nor by any theory proposed in explanation of the new results obtained.

I claim as my invention:

1. A process which comprises reacting an aliphatic saturated polyhalide containing halogen atoms of the group consisting of chlorine and bromine atoms with a paraffin having one tertiary carbon atom per molecule in the presence of a Friedel-Crafts type metal halide catalyst at a temperature between −20° C. and 50° C. to produce therefrom an aliphatic halide having the same number of carbon atoms per molecule but a lower halogen content.

2. A process which comprises reacting a chlorine substituted aliphatic saturated hydrocarbon having a quaternary carbon atom to which is linked by a single non-halogenated carbon atom a monochlorinated carbon atom to which is directly attached another monochlorinated carbon atom with a paraffin having one tertiary carbon atom per molecule in the presence of aluminum chloride at a temperature between −20° C. and 50° C. to produce therefrom an aliphatic halide having the same number of carbon atoms per molecule but a lower halogen content.

3. A process for the preparation of a saturated monohalide which comprises reacting a dihalogenated saturated hydrocarbon and an isoparaffin in the presence of a catalyst of the Friedel-Crafts type at a temperature from about −20° C. to about +30° C. to effect the transfer of a halogen atom from said dihalogenated hydrocarbon to said isoparaffin.

4. A process for the preparation of a saturated halide which comprises reacting a polyhalogenated saturated hydrocarbon and a paraffin having a tertiary carbon atom in the presence of a catalyst of the Friedel-Crafts type at a temperature from about −20° C. to 100° C. to effect transfer of a halogen atom from said polyhalogenated hydrocarbon to said paraffin.

5. A process for the preparation of a saturated chloride which comprises reacting a polychlorinated saturated hydrocarbon and a paraffin having a tertiary carbon atom in the presence of aluminum chloride at a temperature from about −20° C. to about +30° C. to effect transfer of a chlorine atom from said polychlorinated hydrocarbon to said paraffin.

6. A process for the preparation of a saturated monochloride which comprises reacting a dichlorinated saturated hydrocarbon product of the reaction of a tertiary monochloroalkane with a chloromono-olefin and an isoparaffin in the presence of a catalyst of the Friedel-Crafts type at a temperature from about −20° C. to 100° C. to effect the transfer of a chlorine atom from said dichlorinated hydrocarbon to said isoparaffin.

7. A process for the preparation of a haloalkane which comprises reacting a polyhaloalkane having 6 to 21 carbon atoms per molecule and isobutane in the presence of a catalyst containing aluminum chloride at a temperature from about −20° C. to about +30° C. to effect transfer of a halogen atom from said polyhaloalkane to the isobutane.

8. A process for the preparation of a monochloroheptane which comprises reacting a 1,2-dichloro-4,4-dimethylpentane and isobutane in the presence of an aluminum chloride-containing catalyst at a temperature from about −20° C. to about +30° C. to effect transfer of a chlorine atom from said 1,2-dichloro-4,4-dimethylpentane to the isobutane.

KENNETH D. DETLING.

REFERENCES CITED

The following references are of record in the file of this patent:

UNITED STATES PATENTS

| Number | Name | Date |
|---|---|---|
| 1,899,582 | Mark et al. | Feb. 28, 1933 |
| 2,010,387 | Ayres et al. | Aug. 6, 1935 |
| 2,068,772 | Sixt | Jan. 26, 1937 |
| 2,143,050 | Berger | Jan. 10, 1939 |
| 2,286,504 | Parker | June 16, 1942 |
| 2,297,564 | Kirkbride | Sept. 29, 1942 |
| 2,353,766 | Schmerling | July 18, 1944 |
| 2,399,512 | Schmerling | Apr. 30, 1946 |

FOREIGN PATENTS

| Number | Country | Date |
|---|---|---|
| 261,689 | Germany | July 2, 1913 |
| 695,125 | France | Dec. 11, 1930 |
| 824,909 | France | Feb. 18, 1938 |

OTHER REFERENCES

Beilstein: "Handbuch der Organischen Chemie," vol. I, pages 150–1, 157–8, Erganzungswerk, vol. I, page 58.

Henne: "Jour. Am. Chem. Soc.," vol. 60, pages 1697, 2491 (1938).

Simons et al.: "Jour. Am. Chem. Soc.," vol. 60, pages 2596–7 (1938).

Thomas: "Anhydrous Aluminum Chloride in Organic Chemistry," pages 736–7.